United States Patent
Wang et al.

(10) Patent No.: US 9,546,585 B2
(45) Date of Patent: Jan. 17, 2017

(54) APPARATUS, METHOD, AND SYSTEM FOR DIAGNOSING REDUCTANT DELIVERY PERFORMANCE

(71) Applicant: CUMMINS IP, INC., Minneapolis, MN (US)

(72) Inventors: Kerang Wang, Columbus, IN (US); Mickey R. McDaniel, Greenwood, IN (US); Yi Yuan, Columbus, IN (US); Balbahadur Singh, Greenwood, IN (US)

(73) Assignee: CUMMINS IP, INC., Columbus, IN (US)

( * ) Notice: Subject to any disclaimer, the term of this patent is extended or adjusted under 35 U.S.C. 154(b) by 0 days.

(21) Appl. No.: 14/769,614

(22) PCT Filed: Feb. 27, 2014

(86) PCT No.: PCT/US2014/018923
§ 371 (c)(1),
(2) Date: Aug. 21, 2015

(87) PCT Pub. No.: WO2014/134273
PCT Pub. Date: Sep. 4, 2014

(65) Prior Publication Data
US 2016/0010529 A1      Jan. 14, 2016

Related U.S. Application Data

(60) Provisional application No. 61/770,179, filed on Feb. 27, 2013.

(51) Int. Cl.
*F01N 3/00* (2006.01)
*F01N 3/20* (2006.01)
(Continued)

(52) U.S. Cl.
CPC ............... *F01N 3/208* (2013.01); *F01N 11/00* (2013.01); *F17D 3/00* (2013.01);
(Continued)

(58) Field of Classification Search
USPC .................. 60/274, 286, 295, 297, 301, 303
See application file for complete search history.

(56) References Cited

U.S. PATENT DOCUMENTS 8,156,736 B2 *   4/2012   Mullins ................. F01N 3/0253
                                                                  60/276
8,359,826 B2 *   1/2013   Kitazawa ............. F01N 3/0807
                                                                  123/198 D (Continued)

FOREIGN PATENT DOCUMENTS

WO     WO 2014/029301     2/2014

OTHER PUBLICATIONS

Search Report and Written Opinion for PCT/US2014/018923, issued May 28, 2014, 10 pages.

*Primary Examiner* — Binh Q Tran
(74) *Attorney, Agent, or Firm* — Foley & Lardner LLP

(57) ABSTRACT

A system for diagnosing and/or determining the performance of a reductant delivery system may include determining a flow rate offset value for the reductant delivery system. A reduced reductant flow rate may be determined for a reductant dosing command value based, at least in part, on the determined flow rate offset when reductant dosing command is non-zero. A reductant flow rate error can be determined based, at least in part, on a difference between an expected reductant flow rate value corresponding to the reductant dosing command value and the determined reduced reductant flow rate. A performance status value indicative of a performance status of the reductant delivery system may be outputted based, at least in part, on the (Continued)

determined first reductant flow rate error and a predetermined threshold.

20 Claims, 5 Drawing Sheets

(51) Int. Cl.
*F01N 11/00* (2006.01)
*F17D 3/00* (2006.01)

(52) U.S. Cl.
CPC  *F01N 2610/144* (2013.01); *F01N 2900/1812* (2013.01); *Y02T 10/24* (2013.01)

(56) References Cited

U.S. PATENT DOCUMENTS

| | | | | |
|---|---|---|---|---|
| 8,671,663 | B2 * | 3/2014 | Buerglin | 60/274 |
| 8,881,507 | B2 * | 11/2014 | Yan | F01N 3/2066 |
| | | | | 60/274 |
| 8,915,062 | B2 * | 12/2014 | Wang | F01N 3/208 |
| | | | | 60/274 |
| 9,163,539 | B2 * | 10/2015 | Nagata | F01N 3/208 |
| 2009/0248361 | A1 | 10/2009 | Franco et al. | |
| 2010/0101214 | A1 | 4/2010 | Herman et al. | |
| 2011/0083424 | A1 | 4/2011 | Wang et al. | |
| 2012/0006010 | A1 | 1/2012 | Kaemingk et al. | |
| 2012/0067031 | A1 | 3/2012 | Wang et al. | |
| 2012/0255277 | A1 | 10/2012 | Rajagopalan et al. | |

* cited by examiner

APPARATUS, METHOD, AND SYSTEM FOR DIAGNOSING REDUCTANT DELIVERY PERFORMANCE

CROSS REFERENCE TO RELATED APPLICATIONS

This application is a National Stage of PCT Application No. PCT/US2014/018923, filed Feb. 27, 2014, which claims priority from U.S. Provisional Patent Application No. 61/770,179, entitled "Apparatus, Method and System for Diagnosing Reduction Delivery Performance," and filed Feb. 27, 2013, The contents of these applications are hereby incorporated herein by reference in their entirety.

BACKGROUND OF THE INVENTION

Emissions systems for compression-ignition (e.g., diesel) engines typically monitor the release of carbon monoxide (CO), unburned hydrocarbons (UHC), diesel particulate matter (PM) such as ash and soot, and nitrogen oxides ($NO_x$).

With regard to reducing NO emissions, NO reduction catalysts, including selective catalytic reduction (SCR) systems, are utilized to convert $NO_x$ (NO and $NO_2$ in some fraction) to $N_2$ and other compounds. SCR systems utilize a reductant, typically ammonia, to reduce the $NO_x$. Currently available SCR systems can produce high $NO_x$ conversion rates allowing the combustion technologies to focus on power and efficiency. However, currently available SCR systems also suffer from a few drawbacks.

SCR systems utilize a reductant delivery system to introduce a reductant into the exhaust stream upstream of the SCR catalyst. When the proper amount of reductant is available at the SCR catalyst under the conditions, the reductant is utilized to reduce $NO_x$. However, if the reduction reaction rate is too slow, or if a deficient amount of reductant is introduced into the exhaust stream upstream of the SCR catalyst, the SCR system may be unable to convert enough $NO_x$.

The reductant delivery system may under-deliver the needed amount of reductant due to blockage of the reductant flow within the system. For example, there may be unintentional or intentional restrictions in the pressure line of the system. Alternatively, reductant may form deposits in the reductant delivery system (e.g., within the injector nozzle) that may restrict the flow of reductant through the system. In some implementations, a SCR system may provide data (e.g., one or more values) to an on-board diagnostic (OBD) system or unit to provide an alert indicating the failure of, or reduced operability of, a SCR system to convert enough $NO_x$ to meet a predetermined amount. One known indication of the inability of an SCR system to covert enough NO is the inability to deliver the necessary amount of reductant for $NO_x$ conversion due to blockage within the reductant delivery system. Known systems and associated diagnostics fail to adequately diagnose poor performance of reductant delivery systems due to blockage or other failures, and thus may fail to provide the data to the OBD system or unit regarding the malfunction of reductant delivery systems.

SUMMARY

The subject matter of the present application has been developed in response to the present state of the art, and in particular, in response to the problems and needs in the art that have not yet been fully solved by currently available exhaust aftertreatment systems. Accordingly, the subject matter of the present application has been developed to provide apparatus, methods, and systems for diagnosing reductant delivery systems that overcomes at least some shortcomings of the prior art aftertreatment systems.

An implementation relates to a system comprising a reductant delivery system having a reductant pump and a controller. The controller may be configured to determine a flow rate offset value for the reductant delivery system. The flow rate offset value may be based on a first pump command value for the reductant pump when an output pressure value is stabilized and a first reductant dosing command value is zero. The controller may be further configured to determine a first reduced reductant flow rate for a second reductant dosing command value based, at least in part, on the determined flow rate offset when the second reductant dosing command is non-zero. The controller may still further be configured to determine a first reductant flow rate error based, at least in part, on a difference between a reductant flow rate value corresponding to the second reductant dosing command value and the first determined reduced reductant flow rate. The controller may also be configured to output a performance status value indicative of a performance status of the reductant delivery system based, at least in part, on the determined first reductant flow rate error and a predetermined threshold.

Another implementations relates to a non-transitory computer-readable medium storing one or more instructions that, when executed by one or more processors, cause the one or more processors to perform several operations. The operations may include determining a flow rate offset value for a reductant delivery system. The flow rate offset value may be based on a first pump command value for a reductant pump when an output pressure value is stabilized and a first reductant dosing command value is zero. The operations may also include determining a second pump command value for the reductant pump when the output pressure value is stabilized for a second reductant dosing command value when the second reductant dosing command value is non-zero. The operations may further include determining a first reduced reductant flow rate for the second reductant dosing command value based on the determined flow rate offset and the second pump command value. The operations may still further include determining a first reductant flow rate error based, at least in part, on a difference between a reductant flow rate value corresponding to the second reductant dosing command value and the first determined reduced reductant flow rate. The operations may yet further include outputting a performance status value indicative of a performance status of the reductant delivery system based, at least in part, on the determined first reductant flow rate error and a predetermined threshold.

Yet another implementation relates to a method for determining a performance status of a reductant delivery system having a reductant pump, a control valve, and a delivery mechanism. The method may include determining an internal flow rate offset value and determining a reductant flow rate model based on the determined internal flow rate offset value and a slope value. The reductant flow rate model may generate an expected reductant flow rate for a normal-operating reductant delivery system responsive to an inputted pump command value. The method may also include outputting a reductant dosing command value based on a desired reductant dosing flow rate to the control valve. The method may further include determining a pump command value for the reductant dosing command value and determining a reduced reductant flow rate based on the determined reductant flow rate model and the determined pump command value. The method may still further include determining a reductant flow rate error value based, at least in part, on a difference between the desired reductant dosing rate and the determined reduced reductant flow rate. The method may yet further include outputting a performance status value indicative of a performance of the reductant delivery system based on the reductant flow rate error value and a predetermined threshold value.

BRIEF DESCRIPTION OF THE DRAWINGS

In order that the advantages of the subject matter may be more readily understood, a more particular description of the subject matter briefly described above will be rendered by reference to specific implementations that are illustrated in the appended drawings. Understanding that these drawings depict only typical implementations of the subject matter and are not therefore to be considered to be limiting of its scope, the subject matter will be described and explained with additional specificity and detail through the use of the drawings, in which.

DETAILED DESCRIPTION

Reference throughout this specification to features, advantages, or similar language does not imply that all of the features and advantages that may be realized with the subject matter of the present disclosure should be or are in any single implementation. Rather, language referring to the features and advantages is understood to mean that a specific feature, advantage, or characteristic described in connection with an implementation is included in at least one implementation of the present disclosure. Thus, discussion of the features and advantages, and similar language, throughout this specification may, but do not necessarily, refer to the same implementation.

The described features, structures, advantages, and/or characteristics of the subject matter of the present disclosure may be combined in any suitable manner in one or more implementations. In the following description, numerous specific details are provided to impart a thorough understanding of implementations of the subject matter of the present disclosure. One skilled in the relevant art will recognize that the subject matter of the present disclosure may be practiced without one or more of the specific features, details, components, materials, and/or methods of a particular implementation. In other instances, additional features and advantages may be recognized in certain implementations that may not be present in all implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

Figure 1:
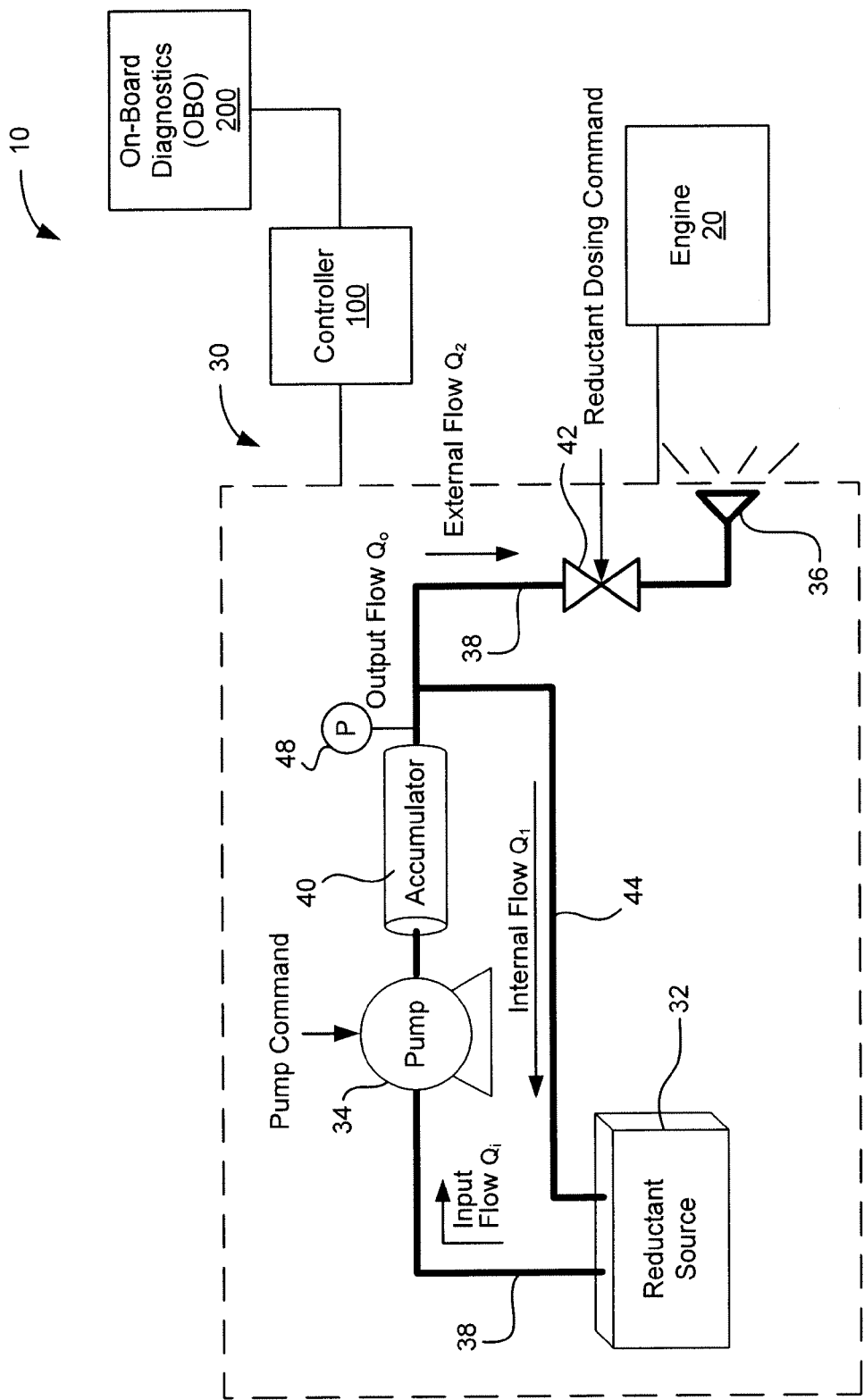
FIG. 1 is a schematic diagram of an engine system having an internal combustion engine and a reductant delivery system in accordance with an implementation.

FIG. 1 depicts an implementation of an engine system 10. The main components of the engine system 10 include an internal combustion engine 20 and an exhaust gas aftertreatment system in exhaust gas-receiving communication with the engine 20. The internal combustion engine 20 can be a compression-ignited internal combustion engine, such as a diesel fueled engine, or a spark-ignited internal combustion engine, such as a gasoline fueled engine. Combustion of the fuel and air in the compression chambers of the engine 20 produces exhaust gas that is operatively vented to an exhaust manifold. From the exhaust manifold, at least a portion of the exhaust gas stream flows from the exhaust manifold into and through the exhaust gas aftertreatment system prior to being vented into the atmosphere through a tailpipe.

Generally, the exhaust gas aftertreatment system is configured to remove various chemical compounds and particulate emissions present in the exhaust gas received from the exhaust manifold. The exhaust gas aftertreatment system includes a selective catalytic reduction "SCR" system that has a reductant delivery system 30. The exhaust aftertreatment system may include any of various other exhaust treatment components known in the art, such as an oxidation catalyst, a PM filter, and an ammonia oxidation catalyst. The reductant delivery system 30 includes a reductant source 32, pump 34, and delivery mechanism 36, such as a reductant doser. The reductant source 32 can be a container or tank capable of retaining a reductant, such as, for example, ammonia ($NH_3$), urea, diesel fuel, diesel exhaust fluid, or diesel oil. The reductant source 32 is in fluid communication with the pump 34, which is configured to pump reductant from the reductant source to the delivery mechanism 36. The delivery mechanism 36 can be a reductant injector positioned upstream of the SCR catalyst. The amount of reductant flowing to the injector 36 is selectively controllable via actuation of a control valve 42 to inject a desired amount of reductant into the exhaust gas stream prior to the exhaust gas entering the SCR catalyst.

The reductant delivery system 30 includes reductant lines through which the reductant flows. In the illustrated implementation, the system 30 includes a reductant supply line 38 and a reductant return line 44. The supply line 38 facilitates the flow of reductant from the reductant source 32 to the pump 34 to be pressurized and sent to the delivery mechanism 36. The return line 44 returns a flow of reductant from the supply line 38 (at a location downstream of the pump 34 and upstream of the delivery mechanism 36) back to the reductant source 32.

The pump 34 can be any of various fluid pumps known in the art. The pump 34 draws reductant from the reductant source 32 at an input pressure and delivers the reductant from the pump at an output pressure higher than the inlet pressure. The reductant entering the pump 34 may be defined by a reductant input flow rate $Q_i$ and the reductant exiting the pump may be defined by a reductant output flow rate $Q_o$. The reductant flowing out of the pump 34 may be proportional to the pump command value, corresponding to a pump speed. That is, the volumetric flow rate of reductant leaving the pump, $Q_o$, is proportional to the pump speed, $\omega$, or $Q_o \sim \omega$.

The pump power, P, is defined by the pressure differential across the pump, $\Delta p$, (i.e., outlet pressure−inlet pressure), the volumetric flow rate, $Q_o$, and the pump efficiency, $\eta$, or:

$$P = \Delta p \times Q_o / \eta.$$

The pump power, P, may also be defined by the electrical current, I, the reference voltage, $V_0$, and a pump command value duty cycle, d (e.g., a pulse width modulated signal duty cycle), or:

$$P = I \times V_0 \times d.$$

Thus, the volumetric flow rate, $Q_o$, is proportional to the pump speed, $\omega$, which is proportional to the pump command value duty cycle, d, or:

$$Q_o \sim \omega \sim d,$$

where the pump efficiency, $\eta$, the pressure differential across the pump, $\Delta p$, the electrical current, I, and the reference voltage, $V_0$, can be considered constants. As will be described in greater detail below, the pump command value duty cycle, d, may be used to determine whether a blockage exists in the reductant delivery system 30 downstream from the pump 34 if, for a desired reductant injection amount, the pump command value duty cycle is below an expected value for a normal-operating reductant delivery system.

In some implementations, the reductant delivery system 30 includes an accumulator 40 downstream of the pump 34 and upstream of the inlet to the reductant return line 44. The accumulator 40 accumulates and temporarily stores a reservoir of reductant output flow rate $Q_o$ at the output pressure. In certain implementations, the accumulator 40 reduces the response time of the supply of pressurized reductant to the delivery mechanism 36. The accumulator 40 may provide other benefits, such as energy conservation, absorption of hydraulic line shock, pressure holding, compensation for fluid leakage and thermal expansion/contraction, and the like. The system 30 may also include one or more pressure sensors 48 that detect the pressure of the reductant within the system. In some implementations, the system 30 includes only the high pressure sensor 48 downstream of the pump 34. In other implementations, the system may, in addition or in lieu of the high pressure sensor 48, include a low pressure sensor upstream of the pump.

In certain embodiments, the engine system 10 includes a controller 100 structured to perform certain operations to control the operation of the engine system 10 and associated sub-systems, such as the internal combustion engine 20 and/or the reductant delivery system 30. The controller 100 may be in communication with an on-board diagnostics (OBD) unit 200. In certain embodiments, the controller 100 forms a portion of a processing subsystem including one or more computing devices having memory, processing, and communication hardware. The controller 100 may be a single device or a distributed device, and the functions of the controller 100 may be performed by hardware and/or as computer instructions on a non-transient computer readable storage medium. Generally, the controller 100 receives one or more inputs, processes the one or more inputs, and transmits one or more outputs. The one or more inputs may include sensed measurements from the sensors and various user inputs. The one or more inputs are processed by the controller 100 using various algorithms, stored data, and other inputs to update the stored data and/or generate one or more output values. The generated one or more output values and/or command values are transmitted to other components of the controller and/or to one or more elements of the engine system 10 to control the system to achieve desired results, and more specifically, achieve desired exhaust gas emissions.

In an implementation, the controller 100 is configured to output a reductant dosing command value to control the operation of the control valve 42 to inject an amount of reductant into the exhaust gas stream at a desired reductant dosing rate and/or to output a pump command value to control speed of the pump 34 (and therefore the pressure and flow rate of reductant in the reductant delivery system 30). The controller 100 can generate the reductant dosing command value for a desired dosing rate based on any of various operating conditions and factors known in the art (e.g., based on engine operating conditions, environmental conditions, NOx sensor output levels, etc.). The controller 100 also generates a pump command value (e.g., a pump command value duty cycle, d, value) associated with a pump speed for a desired pressure for a reductant output flow rate $Q_o$ and transmits the pump command value to the pump 34.

During normal operation, the controller 100 determines a desired reductant dosing rate (e.g., based on engine operating conditions, environmental conditions, $NO_x$ sensor output levels, etc.) and modifies the dosing command value output to the control valve 42 such that, during normal operation, the amount of reductant flowing through the control valve 42 and the delivery mechanism 36 deliver reductant to the exhaust system at the desired reductant dosing rate. The controller 100 also determines and modifies the pump command value output to the pump 34 until the output pressure of the reductant output flow, as measured by the pressure sensor 48, corresponds to a desired output pressure. Thus, during normal operation, for a desired reductant dosing rate there is a corresponding pump command value to maintain the desired output pressure such that the amount of reductant flowing out of the delivery mechanism 36 achieves the desired reductant dosing rate.

The controller 100 generates the pump command value for a pump speed of the pump 34 based on the pressure detected or sensed by the pressure sensor 48 to maintain the output pressure at or near the desired output pressure. If the measured actual output pressure sensed by the pressure sensor 48 is below the desired output pressure, then the controller 100 may increase the generated pump command value to increase the speed of the pump 34, which results in an increase in the volumetric flow rate of reductant out of the pump 34, to increase in the actual output pressure to meet the desired output pressure. If the measured actual output pressure sensed by the pressure sensor 48 is above the desired output pressure, then the controller 100 may reduce the generated pump command value to decrease the speed of the pump 34, which results in a decrease in the volumetric flow rate of reductant out of the pump 34, to decrease the actual output pressure to meet the desired output pressure. When the system pressure is stabilized, the pump command value (which is representative of the pump speed) may be indicative of the output flow rate, $Q_o$, exiting the pump 34.

The output pressure may fluctuate based on the position of the control valve 42 and, correspondingly, the amount of reductant flowing through the valve 42 and into the exhaust gas stream through the delivery mechanism 36. That is, when the control valve 42 is commanded to open (i.e., based on an increased reductant dosing command value), then the output pressure measured by the pressure sensor 48 may decrease responsive to the opening of the control valve 42. Similarly, when the control valve 42 is commanded to close (i.e., based on an increased reductant dosing command value), then the output pressure measured by the pressure sensor 48 may increase responsive to the closing of the control valve 42.

When the control valve 42 is closed and no reductant is flowing through the control valve 42, the pump 34 recirculates the reductant through the return line 44 back to the reductant source 32. Accordingly, the output flow rate, $Q_o$, is equal to the internal flow rate, $Q_1$, of reductant flowing from the supply line 38 back to the reductant source 32 via return line 44. Thus, a minimum pump command value (and therefore pump speed) necessary to maintain a desired output pressure for the system 30 can be determined when the control valve 42 is closed, which may correspond to a reductant dosing command value being zero. In some implementations, the minimum pump command value necessary to maintain a desired output pressure is determined once the output pressure of the system 30 downstream of the pump 34 is stabilized. That is, once the pressure measured by the pressure sensor 48 meets a desired output pressure for a predetermined period of time (e.g., an average pressure value output by the pressure sensor 48 is within a predetermined range for the desired output pressure or the measured values output by the pressure sensor 48 are within a permitted range over the predetermined period of time), then the pump command value is at a value corresponding to a minimum pump operating speed for the desired output pressure when the control valve 42 is closed.

As the control valve 42 is opened to effectuate the injection of reductant through the delivery mechanism 36, the pump 34 must increase the volumetric flow rate of reductant from the pump (and therefore must work harder, indicated by an increase in the pump command value) to maintain the desired output pressure. That is, the output flow rate, $Q_o$ is no longer equal to just the internal flow rate, $Q_1$, but must be increased based on the added external flow rate, $Q_2$, which is controlled based on the position of the control valve 42. Accordingly, to maintain a desired output pressure for the system 30 for the added external flow rate, $Q_2$, in addition to the internal flow rate, $Q_1$, the controller 100 must increase the pump command value (and therefore the speed of the pump 34) to account for the pressure loss associated with the external flow of reductant from the system 30 via the control valve 42 and the delivery mechanism 36. The greater the external flow rate, $Q_2$, (and thus the more reductant exiting the system 30) based on the position of the control valve 42, which is controlled based on the reductant dosing command value, then the greater the pump command value (and thus the pump speed), and vice versa. If the amount of reductant exiting the system is limited by blockages (which reduces the external flow rate, $Q_2$, and, consequently, the amount of reductant actually dosed), then pump 34 may not need to increase the pump command value as much to maintain the same output pressure. Thus, the pump command value can be utilized to diagnose the performance of and detect blockages in the system 30, as will be described in greater detail below.

Figure 2:
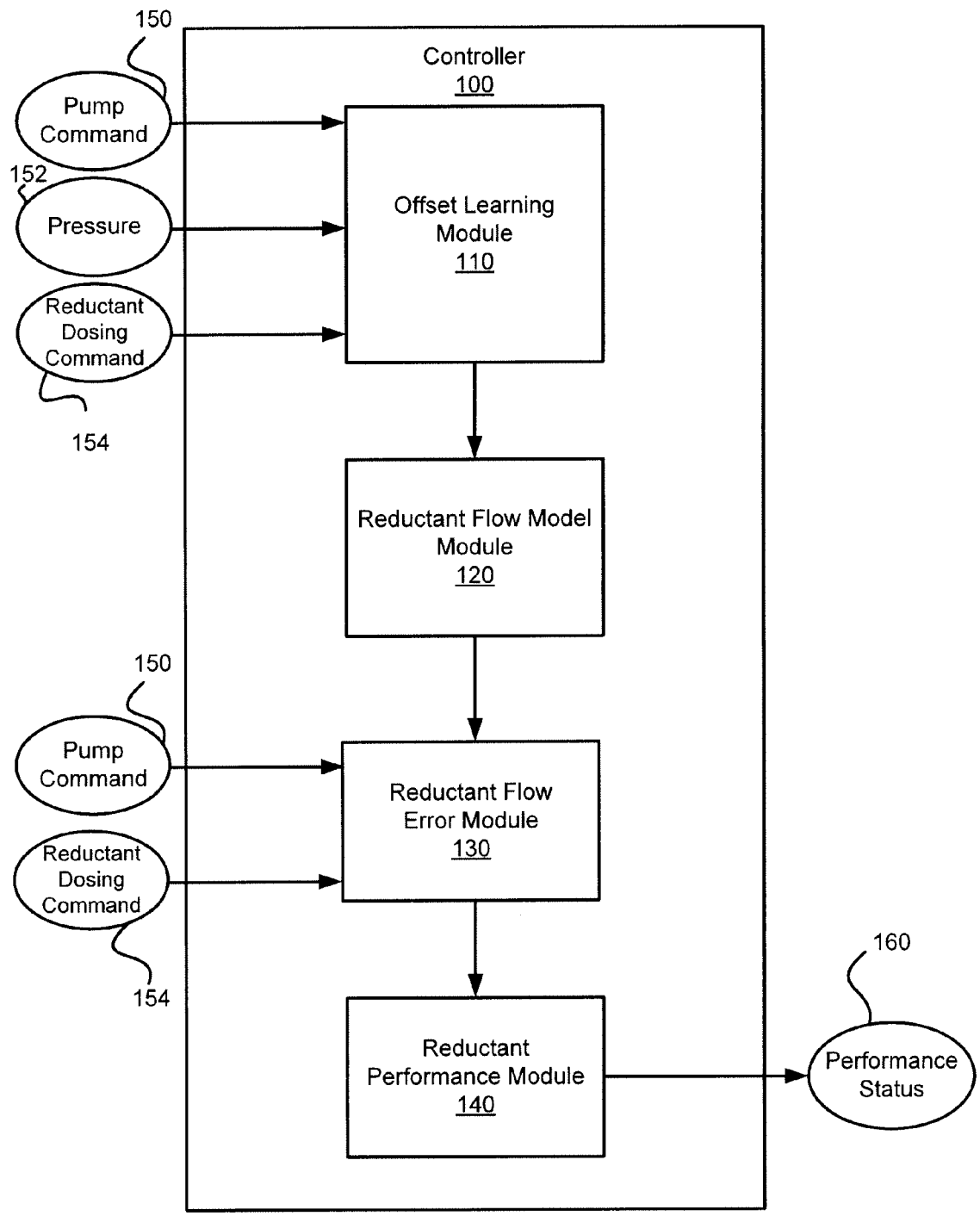
FIG. 2 is a schematic block diagram of a controller of the engine system of FIG. 1 in accordance with an implementation.

In certain implementations, the controller 100 includes one or more modules structured to functionally execute the operations of the controller 100. In certain implementations, the controller 100 includes an offset learning module 110, a reductant flow rate model module 120, a reductant flow rate error module 130, and a reductant performance module 140. The description herein including modules emphasizes the structural independence of the aspects of the controller 100, and illustrates one grouping of operations and responsibilities of the controller 100. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIG. 2.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

As noted above, in some implementations, the output reductant flow rate, $Q_o$, may be modeled as a linear function of the pump command value (indicative of the pump speed) when the pressure within the system 30 downstream of the pump 34 is stabilized. The offset learning module 110 is configured to determine an internal flow rate offset value, a, of the pump 34 for the pump command value. The internal flow rate offset value can be defined as the minimum pump command value (i.e., the pump command value corresponding to the minimum pump speed) for achieving stabilized pressure within the system 30 when the control valve 42 is closed. When the control valve 42 is opened responsive to a reductant dosing command value, the controller 100 will generate a pump command value greater than the internal flow rate offset value to maintain the desired output pressure value while accounting for the added external flow rate, $Q_2$, flowing through the control valve 42 and the delivery mechanism 36. The internal flow rate offset value, a, of a given pump 34 can vary based on different parts or wear thereof, based on the life cycle of the pump 34, and/based on the operating conditions (e.g., the temperature of the reductant). Accordingly, the actual internal flow rate offset value, a, for a given pump, at a given time, and under given operating conditions may vary and, in some implementations, may be determined prior to assessing the performance of the reductant delivery system as will be described in more detail below.

According to an implementation, the offset learning module 110 is configured to execute an offset value learning process to determine the internal flow rate offset value, a, when certain operating conditions have been met. The offset value learning process includes determining a minimum pump command value for the pump 34 when the control valve 42 is closed and setting the internal flow rate offset value, a, equal to the minimum pump command value. In certain implementations, the internal flow rate offset value, a, can be set to an average value for the minimum pump command value measure over a period of time.

In some implementations, the offset value learning process is executed when the measured output pressure value 152 (e.g., sensed pressure using pressure sensor 48) within the system 30 downstream of the pump 34 has stabilized for a stabilization time threshold (i.e., the average outputted pressure value 152 is within a predefined range of a desired output pressure value for a predetermined period of time) and the reductant dosing command value 154 has been zero for a no-dosing time threshold. In some implementations, the offset value learning process may continue until the reductant dosing command value becomes non-zero and/or after a maximum learning period has been reached. The maximum learning period can be a predetermined fixed period of time or, in some implementations, the predetermined period of time may be adjustable based on the configuration of the engine system, among other factors. In certain implementations, the offset value learning process may need to be executed for a predetermined minimum learning period. If the predetermined minimum learning period is not met, then the internal flow rate offset value, a, may either be not determined (e.g., an error may be indicated or diagnostic processes using the internal flow rate offset value may skipped) or the determined internal flow rate offset value, a, may not be relied upon as accurate. The offset learning module 110 is configured to determine and store the internal flow rate offset value, a, if the offset value learning process is executed for the minimum learning period.

Figure 3A:
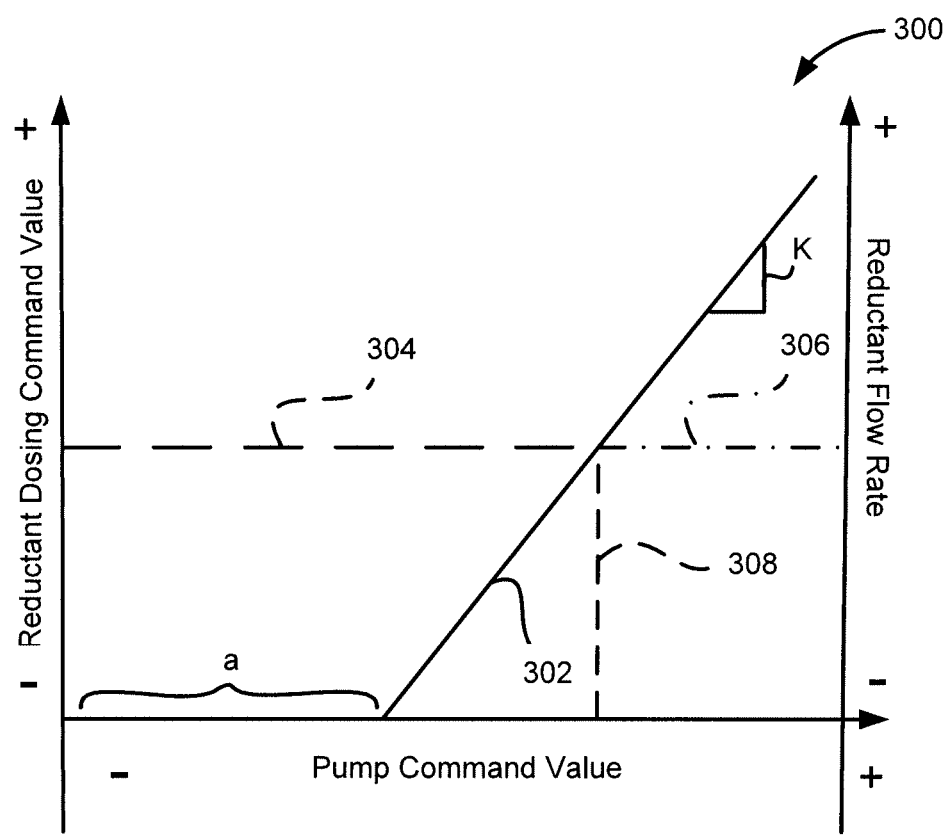
FIG. 3A is a graph illustrating a relationship between a pump command value, a reductant dosing command value, and a reductant flow rate for a reductant delivery system without an obstruction according to an implementation.

The reductant flow rate model module 120 is configured to determine a reductant flow rate model based on predetermined data associated with a healthy or normal (e.g., unblocked) reductant delivery system and the internal flow rate offset value, a, determined by the offset learning module 110. A graphical representation of such a reductant flow rate model is shown by the graph 300 of FIG. 3A. According to some implementations, the reductant flow rate model includes a normal command line 302 that is based on the equation:

$$Q_2 = k \times (d-a)$$

where k is a predetermined constant or slope associated with a healthy or normal reductant delivery system, a is the internal flow rate offset value determined by the offset learning module 110, $Q_2$ is the external flow rate flowing through the control valve 42 and out the delivery mechanism 36, and d is the pump command value. The slope, k, or the relationship between external flow rate, $Q_2$, and the pump command value, d, may be predetermined based on experimental data taken from a test cell running a known healthy or normal reductant delivery system. Accordingly, during operation of a reductant delivery system in the field, the slope, k, may be fixed and the values output by the equation for the normal command line 302 are modified based on the internal flow rate offset value, a. As shown in FIG. 3A, for a desired reductant flow rate 306 for a reductant delivery system without obstructions, a known corresponding reductant dosing command value 304 will result in a corresponding pump command value 308 based on the slope, k, and the internal dosing offset value, a. Thus, for a reductant delivery system without obstructions, a known reductant dosing command value corresponds to a reductant dosing rate and a corresponding pump command value when the system is maintaining a substantially constant output pressure value. Accordingly, for an unobstructed reductant delivery system, the reductant dosing command value may be used as a value representative of a reductant flow rate.

In some implementations, the slope, k, may not be a predetermined constant. For example, the slope, k, may be a function of the internal dosing offset value, a. The relationship between k and a may be determined by experimental tests under different conditions.

Referring back to FIG. 2, the reductant flow rate error module 130 of the controller 100 is configured to determine and store one or more reductant flow rate errors. A reductant flow rate error may occur when the controller 100 commands the control valve 42 to open a desired amount to effect reductant dosing at a desired reductant dosing rate, but the actual reductant dosing rate is less than the desired reductant dosing rate. Such a reductant flow rate error may result from a blockage for the control valve 42 and/or a blockage of the delivery mechanism 36. Such blockages may occur as a result of crystallization of urea or DEF, particulate matter or debris, and/or other blockages.

Figure 3B:
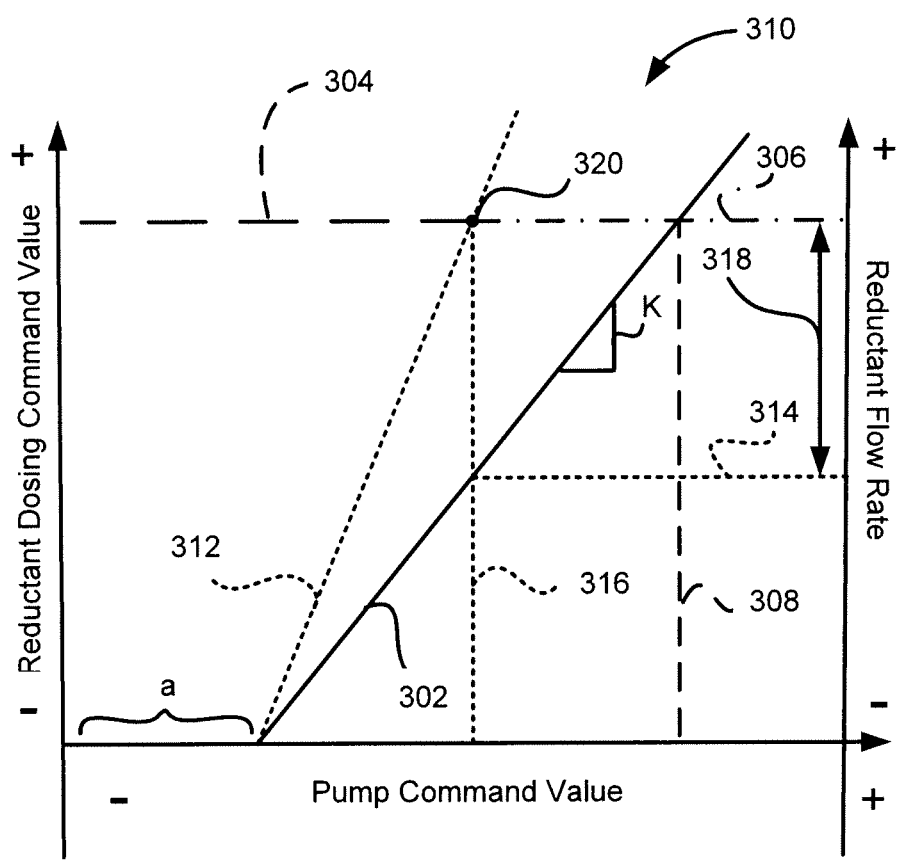
FIG. 3B is a graph illustrating a relationship between a pump command value, a reductant dosing command value, and a reductant flow rate for a reductant delivery system with an obstruction according to an implementation.

A reductant flow rate error may be determined using the reductant flow rate model generated by the reductant flow rate model module 120 and a determined reduced actual reductant flow rate. Referring to FIG. 3B, a reductant flow rate error may be determined based on the offset 318 of a reductant dosing command value 304 relative to a determined reduced actual reductant flow rate 314. That is, if the reductant delivery system has an obstruction, the pump 34 will not need to work as hard to maintain a desired output pressure (such as that measured by pressure sensor 48) because the flow of reductant through the downstream line, the control valve 42, and out the delivery mechanism 36 is restricted, thereby reducing the external flow rate, $Q_2$. As a result, for a reductant dosing command value, the pump command value for a reductant delivery system having an obstruction will be less than the pump command value when the reductant delivery system is not obstructed. FIG. 3B depicts a graph 310 illustrating the normal command line 302 for the reductant delivery system without obstructions based on the reductant flow rate model determined by the reductant flow rate model module 120 and an obstructed command line 312. Once the internal flow rate offset value, a, and the reductant flow rate model have been determined, the controller 100 may output a desired reductant dosing command value 304, which causes the control valve 42 to open based on the desired reductant dosing command value 304. In some implementations, the controller 100 may wait until the output pressure is stabilized. That is, once the pressure measured by the pressure sensor 48 meets the desired output pressure for a predetermined period of time (e.g., the average pressure value output by the pressure sensor 48 is within a predetermined range for the desired output pressure or the measured values output by the pressure sensor 48 are within a permitted range over the predetermined period of time), then the pump command value may be determined for the reductant dosing command value 304. As discussed above, when the reductant delivery system does not have any obstructions, the pump command value 308 to maintain the desired output pressure substantially corresponds to the point where the desired reductant flow rate 306 and the desired reductant dosing command value 304 intersects the normal command line 302.

However, when an obstruction is present in a line downstream of the return line 44, (e.g., in the control valve 42, the delivery mechanism 36, or a portion of the supply line 38 downstream of the return line 44) and the same desired reductant dosing command value 304 is utilized, then the obstructed pump command value 316 for the reductant dosing command value 304 may be less than the pump command value 308. For example, a desired reductant flow rate 306 may correspond to a reductant dosing command value 304. When the control valve 42 is opened based on the reductant dosing command value 304 and the pressure within the system is stabilized, then the point 320 may be determined based on the resulting obstructed pump command value 316 that maintains the stabilized output pressure value for the reductant dosing command value 304. Using the obstructed pump command value 316 and the reductant flow rate model, a reduced actual reductant flow rate 314 may be determined. That is, using the slope, k, the internal flow rate offset value, a, and the obstructed pump command value 316, the reduced actual reductant flow rate 314 may be calculated using the equation:

$$Q_r = k \times (d_r - a)$$

where $Q_r$ is the reduced actual reductant flow rate 314, k is the slope, $d_r$ is the obstructed pump command value 316, and a is the internal flow rate offset value, a. The offset 318 may be determined based on the difference between the desired reductant flow rate 306 corresponding to the reductant dosing command value 304 and the determined reduced actual reductant flow rate 314. It should be understood that the graph 310 and obstructed command line 312 and normal command line 302 are for illustrative purposes and the controller 100 may simply determine values using received data without generating graphs or lines 302, 312.

In some instances, several reductant flow rate errors based on offset 318 may be determined for a threshold time period. The frequency of determining each of the reductant flow rate errors or the number of data points taken for the threshold time period is preselected to provide enough accumulated flow rate errors for an accurate assessment of the reductant delivery system performance, as will be discussed in greater detail herein.

Still referring to FIG. 3B, the normal command line 302 and the obstructed command line 312 may have different slopes (e.g., the obstructed command line 312 steeper than the normal command line 302) because the pump 34 has to work less to maintain the threshold pressure within the reductant delivery system when the system is blocked than when there is no blockage. In other words, for the same pump speed based on the pump command value, less reductant is flowing through the supply line 38 downstream of the pump 34 when the line is blocked than when the line is not blocked. Because the pump 34 is pushing less reductant through the blocked supply line 38 compared to an unblocked supply line, the pump is working less (e.g., lower pump command value and less pump speed) for a given reductant command value.

The difference between a reductant flow rate for a healthy system and the determined reduced reductant flow rate for an unhealthy system for a given pump command value can provide an accurate determination of the level of unhealthiness, blockage, or performance of the reductant delivery system. In some implementations, the slope of the obstructed command line 312 can be determined using the internal offset value, a, (e.g., a coordinate of (a, 0)) and the point 320. The greater the slope of the obstructed command line 312, the greater the blockage of the reductant delivery system. For example, a completely blocked system would result in a completely vertical obstructed command line 312 such that, for any reductant dosing command value, the same pump command value, a, would be determined. In some implementations, the proportionality of the slope of the obstructed command line 312 relative to the slope, k, for the healthy, unblocked reductant delivery system may be indicative of the amount of blockage or obstruction present in the reductant delivery system.

Referring back to FIG. 2, in some implementations, the reductant performance module 140 may analyze the reductant flow rate error determined by the flow rate error module 130 by comparing the reductant flow rate error against a threshold. Based on the comparison, the reductant performance module 140 outputs a performance status value 160 (e.g., pass or fail) of the reductant delivery system 30. In some implementations, the performance status value 160 may simply be a binary value (e.g., a 0 for pass and a 1 for fail). The performance status value 160 can be transmitted to the OBD unit 200. In some implementations, the OBD unit 200 may, responsive to a performance status value 160, provide a visual or auditory indication that communicates the performance of the system 30 represented by the performance status value 160. In some implementations, the OBD unit 200 alerts a user of the performance of the reductant delivery system 30 only when the performance status value 160 indicates a fail status.

In some implementations, several reductant flow rate errors may be determined over a threshold time period and the reductant performance module 140 accumulates or sums reductant flow rate errors and compares the accumulated reductant flow rate error over the threshold time period to a predetermined threshold value. For example, the reductant performance module 140 may perform a CUSUM analysis of the several reductant flow rate errors. In some implementations, the predetermined threshold can be a regulated threshold or some other predetermined threshold associated with a system having an undesirable amount of blockage. If the accumulated reductant flow rate error is equal to or exceeds the threshold, then the reductant performance module 140 generates a performance status value 160 indicative of a fail status (e.g., outputting a 1 value for the performance status value 160). However, if the accumulated reductant flow rate error is not equal to or exceeds the threshold, then the reductant performance module 140 generates a performance status value 160 indicative of a pass status (e.g., outputting a 0 value for the performance status value 160).

In some implementations, the reductant performance module 140 can compare the accumulated reductant flow rate error against multiple thresholds to provide further discretized performance status value 160 that each indicate varying degrees of performance (e.g., poor, medium-poor, medium, medium-good, and good). In some implementations, the performance status value 160 can provide a relative indication of the performance of the system 30 (e.g., a discrete value, such as a value between 0, inclusive, and 1, inclusive) based on the accumulated reductant flow rate error relative to the threshold (e.g., a percentage of the accumulated reductant flow rate error to the threshold value). In some implementations, the OBD unit 200 may utilize the discretized performance status values 160 to report to a user the evolution (e.g., rate of decay) of the performance of the system 30 over time such that a user can anticipate when the system 30 may reach a blockage level exceeding regulated amounts.

Figure 4:
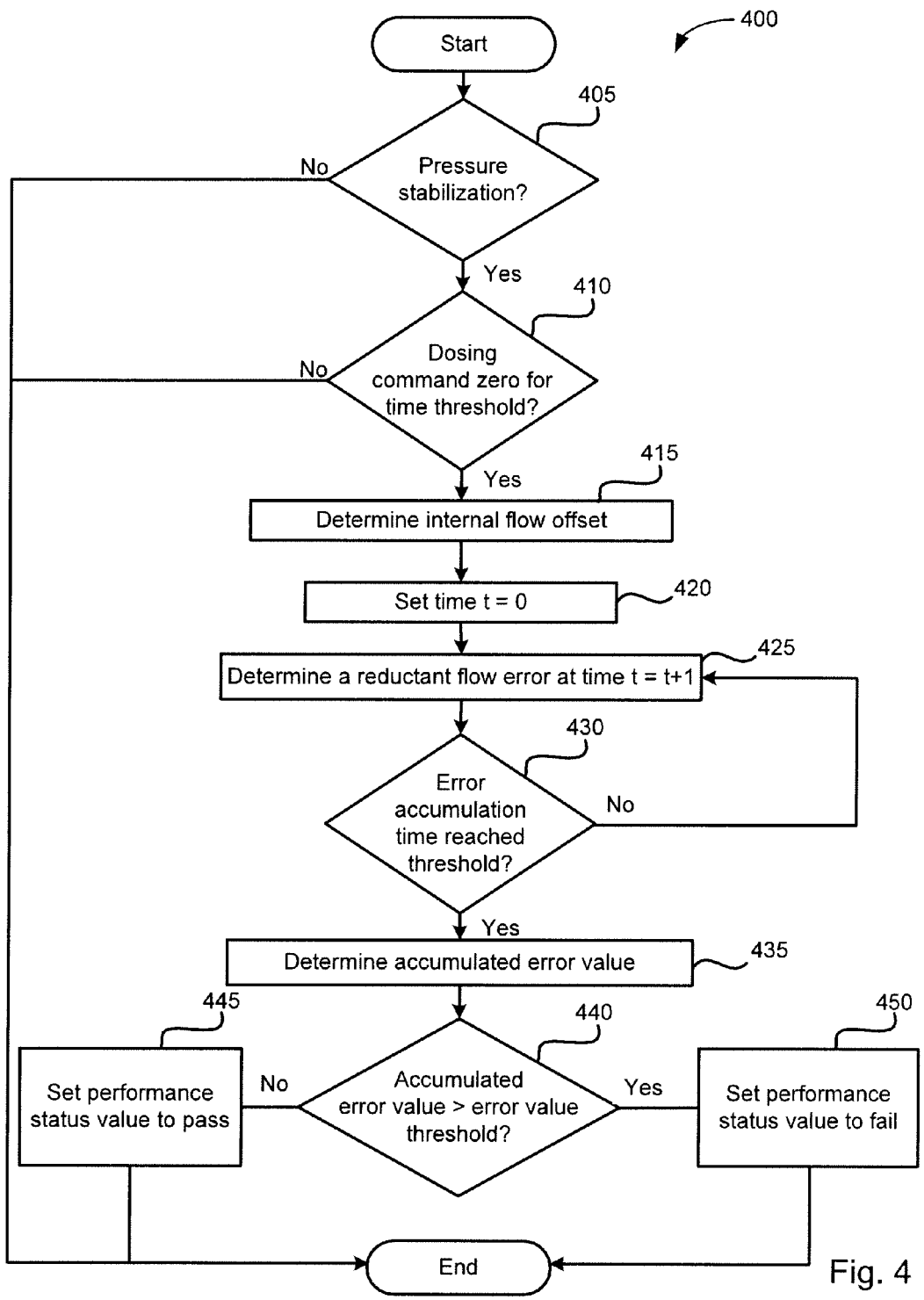
FIG. 4 is a flow chart diagram illustrating a process for diagnosing the performance of a reductant delivery system according to an implementation.

As shown in FIG. 4, a process 400 for diagnosing the performance of a reductant delivery system includes determining if a pressure stabilization has been reached (block 405). In some implementations, the pressure stabilization may be determined based on a predetermined time threshold elapsing while the control valve is closed. In other implementations, the pressure stabilization may be determine when an average pressure value output by the pressure sensor is within a predetermined range for the desired output pressure or the measured values output by the pressure sensor are within a permitted range over the predetermined period of time. If the pressure stabilization has not occurred, then the process 400 may end.

If the pressure has stabilized (block 405), then the process 400 proceeds to determine whether the dosing command value has been zero for a dosing time threshold (block 410). Similar to the pressure stabilization determination (block 405), if the determination of whether the dosing command value has been zero for a dosing time threshold (block 410) is negative, then the process 400 may end. In some implementations, the determination of whether the dosing command value has been zero for a dosing time threshold (block 410) and the determination of whether pressure stabilization has occurred (block 405) may be combined such that both conditions must be met prior to the process 400 proceeding. In other implementations, the determination of whether the dosing command value has been zero for a dosing time threshold (block 410) may occur before the determination of whether pressure stabilization has occurred (block 405). In still further implementations, the reductant command value may be set to a zero value prior to determining whether pressure stabilization has occurred (block 405) such that the determination of whether the dosing command value has been zero for a dosing time threshold (block 410) may be omitted.

If the dosing command value has been zero for a dosing time threshold (block 410), then the process 400 proceeds to determine the internal flow rate offset value, a (block 415). In an implementation, the internal flow rate offset value, a, is determined by executing an offset value learning process or algorithm, such as that implemented by the offset learning module 110. The internal flow rate offset value, a, can then be used to determine the reductant flow rate model, such as that described in reference to FIGS. 3A-3B.

After the internal flow rate offset value, a, is determined (block 415), a time, t, is set to zero (block 420) and the process 400 proceeds to determine a reductant flow rate error at time t=t+1 (block 425). The reductant flow rate error may be determined using the reductant flow error module 130 using the offset 318 of FIG. 3B. In some implementations, the value determined flow rate error may be stored in a non-transient computer readable storage medium.

The process 400 then determines whether an error accumulation time threshold has been reached (block 430). The error accumulation time threshold may be based on a sampling rate and a desired number of reductant flow rate errors or the error accumulation time threshold may be based on a predetermined time threshold. If the error accumulation time threshold has not been reached (block 430), then the process 400 returns to determine another reductant flow rate error and increments the value for the time t by t=t+1 (block 425).

If the error accumulation time threshold has been reached (block 430), then the process 400 accumulates or sums the determined reductant flow rate error(s) to determine an accumulated error value (block 435). In some implementations, the determined accumulated error value may be used in a CUSUM analysis of the several reductant flow rate errors by weighting the reductant flow rate errors in determining the accumulated error value. In some implementations, a singular reductant flow rate error may be used as the accumulated error value.

The process 400 determines if the accumulated error value is greater than an error value threshold (block 440). If the accumulated error value is less than the error value threshold (block 440), then the process 400 sets the performance status value to a value indicative of a pass value (block 445) and the process 400 ends. If the accumulated error value is greater than or equal to the error value threshold (block 440), then the process 400 sets the performance status value to a value indicative of a fail value (block 450) and the process 400 ends. In some implementations, the controller 100 and associated modules operate to perform the steps of the process 400.

The process diagram of FIG. 4 described above is generally set forth as logical flow chart diagram. As such, the depicted order and labeled steps are indicative of representative implementations of the process 400. Other steps, orderings and processes may be conceived that are equivalent in function, logic, or effect to one or more steps, or portions thereof, of the process 400 illustrated in FIG. 4 unless otherwise specified.

Additionally, the format and symbols employed are provided to explain the logical steps of FIG. 4 and are understood not to limit the scope of the process 400. Although various arrow types and line types may be employed in the process diagram of FIG. 4, they are understood not to limit the scope of the corresponding process 400. Indeed, some arrows or other connectors may be used to indicate only the logical flow of the process 400. For instance, an arrow may indicate a waiting or monitoring period of unspecified duration between enumerated steps of the process 400. Additionally, the order in which a particular step of the process 400 occurs may or may not strictly adhere to the order of the corresponding steps shown unless otherwise indicated.

In some implementations, the internal flow rate offset value, a, may vary in response to environmental conditions, such as temperature. In some implementations, the systems and processes described herein may determine the internal flow rate offset value, a, several times or at a predetermined frequency such that the internal flow rate offset value, a, is updated to account for temperature changes such that the error of the internal flow rate offset value, a, that results from temperature changes may be reduced and/or accounted for based on the frequency with which the internal flow rate offset value, a, is determined. In other implementations, the internal flow rate offset value, a, may be modified responsive to temperature changes based on determined function. For example, the internal flow rate offset value, a, may be a linear function of temperature, such as:

$$a = m \times T + b$$

where a is the internal flow rate offset value, m is a calibrated slope, T is the temperature, and b is an offset value. In some implementations, the values for m and b may be based on tests at several different temperature T values.

Implementations of the present disclosure may utilize a computer readable medium that may be a tangible computer readable storage medium storing computer readable instructions that, when executed by a data processor, cause the data processor to perform one or more operations. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable instructions for use by and/or in connection with an instruction execution system, apparatus, or device.

The computer readable medium may also be a computer readable signal medium. A computer readable signal medium may include a propagated data signal with computer readable instructions embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable instructions for use by or in connection with an instruction execution system, apparatus, or device. Computer readable instructions embodied on a computer readable signal medium may be transmitted using any appropriate medium, including but not limited to wireless, wireline, optical fiber cable, Radio Frequency (RF), or the like, or any suitable combination of the foregoing In an implementation, the computer readable medium may comprise a combination of one or more computer readable storage mediums and one or more computer readable signal mediums. For example, computer readable instructions may be both propagated as an electro-magnetic signal through a fiber optic cable for execution by a data processor and stored on RAM storage device for execution by the data processor.

Computer readable instructions for carrying out operations for aspects of the present invention may be written in any singular or combination of one or more programming languages, including an object oriented programming language such as JAVA, SMALLTALK, C++ or the like and conventional procedural programming languages, such as the "C" programming language or similar programming languages.

The present disclosure may be embodied in other specific forms without departing from its spirit or essential characteristics. The described implementations are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system for diagnosing performance of a reductant delivery system, comprising:
   a reductant delivery system comprising a reductant pump; and
   a controller configured to:
      determine a reductant flow rate offset value for the reductant delivery system, the reductant flow rate offset value based on a first pump command value for the reductant pump when an output pressure value from a pressure sensor is stabilized and a first reductant dosing command value controlling an amount of reductant to a delivery mechanism of the reductant delivery system is zero,
      determine a first reduced reductant flow rate for a second reductant dosing command value based, at least in part, on the determined reductant flow rate offset value, the second reductant dosing command being non-zero,
      determine a first reductant flow rate error based, at least in part, on a difference between a reductant flow rate value corresponding to the second reductant dosing command value and the first determined reduced reductant flow rate, and
   output a performance status value indicative of a performance status of the reductant delivery system based, at least in part, on the determined first reductant flow rate error and a predetermined threshold.

2. The system of claim 1, wherein the reductant delivery system further comprises a control valve, and wherein the controller is further configured to:
   output the first reductant dosing command value to the control valve, and
   determine an output pressure value is stabilized responsive to an average pressure value remaining within a predetermined range for a desired output pressure for a predetermined period of time.

3. The system of claim 1, wherein the reductant flow rate offset value is determined responsive to the second reductant dosing command value being non-zero.

4. The system of claim 1, wherein the reductant flow rate offset value is determined responsive to exceeding a maximum learning period.

5. A system, comprising:
   a reductant delivery system comprising a reductant pump; and
   a controller configured to:
      determine a flow rate offset value for the reductant delivery system, the flow rate offset value based on a first pump command value for the reductant pump when an output pressure value is stabilized and a first reductant dosing command value is zero,
      determine a first reduced reductant flow rate for a second reductant dosing command value based, at least in part, on the determined flow rate offset value, the second reductant dosing command being non-zero,
      determine a first reductant flow rate error based, at least in part, on a difference between a reductant flow rate value corresponding to the second reductant dosing command value and the first determined reduced reductant flow rate,
      determine a second reduced reductant flow rate for the second reductant dosing command value based, at least in part, on the determined flow rate offset value,
      determine a second reductant flow rate error based, at least in part, on a difference between the reductant flow rate value corresponding to the second reductant dosing command value and the second determined reduced reductant flow rate,
      determine an accumulated error value based, at least in part, on the first reductant flow rate error and the second reductant flow rate error, and
      output a performance status value indicative of a performance status of the reductant delivery system based on the determined accumulated error value and the predetermined threshold.

6. The system of claim 5, wherein the accumulated error value is based on a plurality of reductant flow rate errors over a predetermined error accumulation time threshold.

7. The system of claim 6, wherein the accumulated error value is based on a CUSUM analysis of the plurality of reductant flow rate errors.

8. The system of claim 1, wherein determining the first reduced reductant flow rate for the reductant dosing command value comprises:
   determining a second pump command value for the reductant pump when the output pressure value is stabilized for the second reductant dosing command value, and determining the first reduced reductant flow rate for the second reductant dosing command value based on the determined reductant flow rate offset and the second pump command value.

9. The system of claim 1, wherein the performance status value is outputted to an on-board diagnostic (OBD) system.

10. The system of claim 1, further comprising:
an internal combustion engine; and
an exhaust aftertreatment system in fluid communication with the internal combustion engine for receiving exhaust from the internal combustion engine,
wherein the reductant delivery system is in fluid communication with a portion of the exhaust aftertreatment system for dosing a reductant into the exhaust aftertreatment system.

11. A non-transitory computer-readable medium storing one or more instructions that, when executed by one or more processors, cause the one or more processors to perform operations comprising:
determining a reductant flow rate offset value for a reductant delivery system, the reductant flow rate offset value based on a first pump command value for a reductant pump when an output pressure value from a pressure sensor is stabilized and a first reductant dosing command value controlling an amount of reductant to a delivery mechanism of the reductant delivery system is zero;
determining a second pump command value for the reductant pump when the output pressure value from the pressure sensor is stabilized for a second reductant dosing command value, the second reductant dosing command value being non-zero;
determining a first reduced reductant flow rate for the second reductant dosing command value based on the determined reductant flow rate offset value and the second pump command value;
determining a first reductant flow rate error based, at least in part, on a difference between a reductant flow rate value corresponding to the second reductant dosing command value and the first determined reduced reductant flow rate; and
outputting a performance status value indicative of a performance status of the reductant delivery system based, at least in part, on the determined first reductant flow rate error and a predetermined threshold.

12. The non-transitory computer-readable medium of claim 11, wherein the stored one or more instructions to cause the one or more processors to perform operations further comprises:
outputting the first reductant dosing command value to a control valve; and
determining an output pressure value is stabilized responsive to an average pressure value remains within a predetermined range for a desired output pressure for a predetermined period of time.

13. A non-transitory computer-readable medium storing one or more instructions that, when executed by one or more processors, cause the one or more processors to perform operations comprising:
determining a flow rate offset value for a reductant delivery system, the flow rate offset value based on a first pump command value for a reductant um when an output pressure value is stabilized and a first reductant dosing command value is zero;
determining a second pump command value for the reductant pump when the output pressure value is stabilized for a second reductant dosing command value, the second reductant dosing command value being non-zero;
determining a first reduced reductant flow rate for the second reductant dosing command value based on the determined flow rate offset value and the second pump command value;
determining a first reductant flow rate error based, at least in part, on a difference between a reductant flow rate value corresponding to the second reductant dosing command value and the first determined reduced reductant flow rate;
determining a second reduced reductant flow rate for the second reductant dosing command value based, at least in part, on the determined flow rate offset value;
determining a second reductant flow rate error based, at least in part, on a difference between the reductant flow rate value corresponding to the second reductant dosing command value and the second determined reduced reductant flow rate;
determining an accumulated error value based, at least in part, on the first reductant flow rate error and the second reductant flow rate error; and
outputting a performance status value indicative of a performance status of the reductant delivery system based on the determined accumulated error value and the predetermined threshold.

14. The non-transitory computer-readable medium of claim 13, wherein the accumulated error value is based on a plurality of reductant flow rate errors over a predetermined error accumulation time threshold.

15. The non-transitory computer-readable medium of claim 14, wherein the accumulated error value is based on a CUSUM analysis of the plurality of reductant flow rate errors.

16. The non-transitory computer-readable medium of claim 11, wherein the outputted performance status value is a binary value.

17. A method for determining a performance status of a reductant delivery system comprising a reductant pump, a control valve, and a delivery mechanism, the method comprising:
determining, using one or more data processors, an internal flow rate offset value of the reductant delivery system;
determining, using one or more data processors, a reductant flow rate model based on the determined internal flow rate offset value and a slope value, the reductant flow rate model generating an expected reductant flow rate for a normal-operating reductant delivery system responsive to an inputted pump command value;
outputting, using one or more data processors, a reductant dosing command value based on a desired reductant dosing flow rate to the control valve;
determining, using one or more processors, a pump command value based on the reductant dosing command value;
determining, using one or more data processors, a reduced reductant flow rate based on the determined reductant flow rate model and the determined pump command value;
determining, using one or more data processors, a reductant flow rate error value based, at least in part, on a difference between the desired reductant dosing rate and the determined reduced reductant flow rate; and outputting a performance status value indicative of a performance of the reductant delivery system based on the reductant flow rate error value and a predetermined threshold value.

18. The method of claim 17 further comprising:
outputting the reductant dosing command value to the control valve, the reductant dosing command value having a zero value; and
determining, using the one or more data processors, an output pressure value from a pressure sensor is stabilized responsive to an average pressure value remaining within a predetermined range for a desired output pressure for a predetermined period of time;
wherein the determination of the internal flow rate offset value is responsive to determining the output pressure is stabilized.

19. The method of claim 18, wherein the slope value is a predetermined constant slope value.

20. The method of claim 18, wherein the slope value is proportional to the internal flow rate offset value.

* * * * *